US009809205B2

(12) United States Patent
Förster et al.

(10) Patent No.: US 9,809,205 B2
(45) Date of Patent: Nov. 7, 2017

(54) METHOD AND CONTROL APPARATUS FOR ACTUATING A BRAKING DEVICE IN THE DRIVE TRAIN OF A VEHICLE WITH AN AUTOMATIC TRANSMISSION

(71) Applicant: AUDI AG, Ingolstadt (DE)

(72) Inventors: Kilian Förster, Beilngries (DE); Dietmar Wohnert, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/121,488

(22) PCT Filed: Feb. 25, 2015

(86) PCT No.: PCT/EP2015/000426
§ 371 (c)(1),
(2) Date: Aug. 25, 2016

(87) PCT Pub. No.: WO2015/128082
PCT Pub. Date: Sep. 3, 2015

(65) Prior Publication Data
US 2016/0355165 A1  Dec. 8, 2016

(30) Foreign Application Priority Data
Feb. 26, 2014  (DE) .......................... 10 2014 002 817

(51) Int. Cl.
*B60W 10/00* (2006.01)
*B60T 7/12* (2006.01)
(Continued)

(52) U.S. Cl.
CPC .............. *B60T 7/122* (2013.01); *B60T 1/005* (2013.01); *B60T 2201/06* (2013.01); *F16H 63/486* (2013.01)

(58) Field of Classification Search
CPC ...... B60T 7/122; B60T 1/005; B60T 2201/06; F16H 63/486
See application file for complete search history.

(56) References Cited

U.S. PATENT DOCUMENTS 6,401,899 B1 * 6/2002 Kanehisa ................ F16H 63/48
192/219
6,679,810 B1  1/2004 Boll et al.
(Continued)

FOREIGN PATENT DOCUMENTS

CN  101121400 A  2/2008
CN  101568454 A  10/2009
(Continued)

OTHER PUBLICATIONS

International Search Report dated May 12, 2015 in corresponding Application No. PCT/EP2015/000426; 13 pgs.
(Continued)

*Primary Examiner* — David J Hlavka
(74) *Attorney, Agent, or Firm* — Maier & Maier, PLLC

(57) ABSTRACT

A method for activating a braking device in the drive train of a vehicle with an automatic gear box, a gear-side parking brake, and a braking system. The vehicle, starting from a parked position with an engaged parking lock, and under the presence of a starting condition, a control apparatus independent from a driver request, controls the braking system to secure against the vehicle rolling away by until the parking lock is released.

20 Claims, 6 Drawing Sheets

(51) Int. Cl.
*B60T 1/00* (2006.01)
*F16H 63/48* (2006.01)

(56) References Cited

U.S. PATENT DOCUMENTS

| | | | |
|---|---|---|---|
| 9,499,144 B2* | 11/2016 | Ye | ............................ G01P 3/487 |
| 9,555,780 B2* | 1/2017 | Hong | .................. B60W 10/182 |
| 2008/0051252 A1 | 2/2008 | Nishimura | |
| 2010/0048352 A1* | 2/2010 | Yamamoto | .............. B60T 7/085 |
| | | | 477/92 |
| 2013/0190970 A1* | 7/2013 | Baehrle-Miller | ....... B60T 1/005 |
| | | | 701/34.4 |

FOREIGN PATENT DOCUMENTS

| | | |
|---|---|---|
| CN | 101817344 A | 9/2010 |
| CN | 102248891 A | 11/2011 |
| CN | 102632882 A | 8/2012 |
| CN | 102678917 A | 9/2012 |
| CN | 102849051 A | 1/2013 |
| CN | 102947147 A | 2/2013 |
| CN | 102959211 A | 3/2013 |
| CN | 103029692 A | 4/2013 |
| CN | 103502699 A | 1/2014 |
| CN | 102556020 B | 12/2014 |
| DE | 197 11 851 A1 | 9/1998 |
| DE | 198 38 886 A1 | 10/1999 |
| DE | 103 40 250 A1 | 3/2005 |
| DE | 10 2004 015 710 A1 | 7/2005 |
| DE | 10-2004-047-100 B3 | 3/2006 |
| DE | 60206233 T2 | 6/2006 |
| DE | 10 2007 047 234 A1 | 4/2008 |
| DE | 102007029910 A1 | 9/2008 |
| DE | 20 2008 013 392 U1 | 1/2009 |
| DE | 10 2009 038 138 A1 | 12/2010 |
| DE | 10 2011 018 875 A1 | 10/2012 |
| DE | 10 2011 110 913 A1 | 2/2013 |
| DE | 10 2011 088 669 A1 | 6/2013 |
| DE | 10 2013 102 606 A1 | 9/2013 |
| DE | 102012223113 A1 | 6/2014 |
| DE | 10 2013 217 986 A1 | 8/2014 |
| DE | 10 2013 212 829 A1 | 1/2015 |
| EP | 0 976 634 A2 | 2/2000 |
| EP | 1 327 566 B1 | 7/2003 |
| EP | 2 559 600 A1 | 2/2013 |
| JP | H08-198080 A | 8/1996 |
| WO | 02/046007 A1 | 6/2002 |

OTHER PUBLICATIONS

German Examination Report dated Feb. 20, 2015 in corresponding Application No. 10 2014 002 817.8; 8 pgs.

Winner, Hermann; Wolf, Gabriele: Handbuch Fahrerassistenzsysteme: Grundlagen, Komponenten und Systeme for aktive Sicherheit und Kemfort. Wiesbaden: Vieweg+Teubner, 2009. S. 271-286.—ISBN: 9783834802873, 18 pgs.

International Preliminary Report on Patentability dated Jun. 9, 2016 in corresponding Application No. PCT/EP2015/000426; 16 pgs.

Notification of Transmittal of the Translation of the International Preliminary Report on Patentability dated Sep. 1, 2016, in connection with corresponding International Application No. PCT/EP2015/000426 (7 pgs).

Chinese Office Action dated May 25, 2017, in connection with corresponding CN Application No. 201580010426.8 (7 pgs).

* cited by examiner

METHOD AND CONTROL APPARATUS FOR ACTUATING A BRAKING DEVICE IN THE DRIVE TRAIN OF A VEHICLE WITH AN AUTOMATIC TRANSMISSION

BACKGROUND

The invention relates to a method for actuating a braking device in the drive train of a vehicle, especially a motor vehicle, with an automatic transmission according to the preamble of claim 1. Furthermore, the invention relates to a control apparatus for actuating a braking device in the drive train of a vehicle, especially a motor vehicle, with an automatic transmission according to the preamble of claim 24 as well as a vehicle according to claim 25.

In modern motor vehicles with an automatic transmission, various securing mechanisms exist to park the vehicle securely. These components of securing mechanisms forming a braking device are in essence the parking brake and the service brake as well as the parking lock in the automatic transmission itself. The service brake mainly enables the reduction of the vehicle speed up to the standstill of the vehicle and is regularly engaged by means of a brake pedal, but can also be developed by means of a braking force booster device (active braking force booster) or slip control system (ESC), for example in highly automated or piloted driving. The service brake acts preferentially on all wheels of the vehicle. The service brake is often designed as a hydraulic service brake, in which the braking force is transmitted hydraulically by means of fluid pressure in brake lines, but alternatively, it may also be a pneumatic service brake, in which the braking force is transmitted pneumatically by means of compressed air in the brake lines.

The parking brake (often also called emergency brake) is conventionally a mechanic parking brake that is engaged by the driver with the foot or hand and that creates a locking force by means of pull cables on the respective vehicle wheels. Specifically, a mechanical force is created by the operator by means of an actuating unit, which is transmitted by means of mechanic pull cables up to the brake system where then a force is exerted on a brake disc or brake drum. Modern parking brakes are designed as electric or electronic parking brakes where the actuators transmitting the braking force are actuated by means of an electric control apparatus. The parking brake is intended to secure a stationary or parked vehicle against rolling away, even on an inclined roadway. In other words, this means that the parking brake, like the parking lock described in further detail below, is generally designed for continuously stopping (parking) without a time limitation, whereas the service brake is principally designed for short-term stopping.

The parking lock in the automatic transmission works in such a way that when the driver selects the gear "P", for example by means of a selector lever, a parking pawl in the gearbox is engaged which is preferentially controlled electrically or operated electro-mechanically. This parking pawl engages with the respective park-lock wheel which is preferentially positioned on a drive shaft of the gearbox or of the drive train in a rotationally fixed manner. The parking pawl may be connected to the gearbox housing itself, for example. As the parking pawl engages with the park-lock wheel, the latter is blocked in such a manner that it cannot be rotated anymore, thereby also blocking the driving shaft of the gearbox or drive train, and therefore also the wheels, of the vehicle. When a vehicle is parked on a slope at an incline, for example (or generally speaking, on a sloping plane), the parking lock is conventionally under stress, as the vehicle, after the gear "P" was engaged, will still roll a little backwards until the parking lock engages. Concretely, the park-lock wheel is subjected to a torque, which is determined by way of the downward force on the vehicle. This torque is supported by the pawl on the gearbox housing, which eventually causes the pawl cogs to interlock strongly with the cogs of the parking lock, resulting in a right-sided parking lock charge or a left-sided parking lock charge, depending on the direction of the torque. When disengaging or deactivating the parking lock, which involves the disengagement of the cogs of the parking pawl from the cogs of the park-lock wheel, this charged condition in the drive train or gearbox leads to the sudden relaxation of the drive train, which is felt on the vehicle as a distinct jolt in addition to an often loud noise (disengagement impact), which is perceived by a user as unpleasant and disruptive.

An additional disadvantage is that the necessary force to disengage the parking lock increases with the magnitude of the charge. Under certain circumstances, this may lead to the situation that the parking lock can only be disengaged with much force. The magnitude of the charge itself depends on the braking torque of the wheels, which in turn depends on the downward force. The downward force in turn depends on the roadway inclination and on the vehicle weight.

From DE 10 2013 212 829 A1, a system and method are known for combined control of an electronically controlled parking brake and an electronically controlled parking lock of a motor vehicle, embodied as a mechanical locking device, by means of which a disengagement impact is to be prevented when disengaging a parking lock of a motor vehicle designed as a mechanical lock. Specifically, this system comprises an electronic parking brake device for electronically controlling the parking brake, an electronic locking device for electronically controlling the parking lock, an electronic hill start assistance device for electronic control of the parking brake, an electronic device for detecting the presence of at least one parking condition, and an automatic sequence controller, which controls the parking brake device, the locking device and the hill start assistance device in such a way that upon the detection of the parking condition, the parking lock is activated by means of the locking device, the parking brake device starts establishing a tightening pressure sufficient for activating the parking brake, and the parking brake is set by means of the hill start assistance device until the tightening pressure necessary for activating the parking brake has been built up by means of the parking brake device. By activating the parking brake by means of the hill start assistance device until the tightening pressure necessary for activating the parking brake has been built up by means of the parking brake device, a vehicle is to be prevented from moving from a standstill after the activation of the parking lock, when the built-up tightening pressure necessary for activating the parking brake by means of the parking brake device is not yet sufficient for activating the parking brake. This is meant to prevent the charging of the parking brake embodied as a mechanical locking device. This, in turn, is meant to prevent the adverse disengagement impact upon the release of the parking lock. Specifically, the vehicle is thus secured against rolling away solely by the parking brake.

However, despite this measure, the driver may get into situations that generate an undiminished disengagement impact. This happens, for example, when the driver, starting from a stationary position with engaged parking lock, releases the parking brake before disengaging the parking lock, because it allows the vehicle to roll away and fall into the parking lock, which braces itself as described above.

SUMMARY OF THE DISCLOSURE

In contrast, the task of the present invention is to provide a method and a control apparatus for actuating a braking device of a vehicle featuring an automatic transmission, in particular a motor vehicle, by means of which a parking lock actuation is optimized such that a disengagement impact when disengaging the parking lock is reliably prevented.

This task is accomplished by way of the characteristics of the independent patent claims. Advantageous embodiments are the subject of the respective dependent claims.

According to claim 1, a method for actuating a braking device of a vehicle featuring an automatic transmission, in particular a motor vehicle, with a gear-side parking lock and at least one braking system, preferentially formed by a service brake and/or a parking brake that can be actuated independently from a service brake in the sense of the above definitions. According to the invention, the vehicle, starting from a parked or stationary position with an engaged parking lock, in particular an unstressed or uncharged parking lock, when a starting condition is given, is secured against rolling away by at least one brake system, preferentially independently of driver input and/or preferentially controlled by at least one control apparatus, until the parking lock is disengaged.

With this inventive solution it can be ensured that a parking lock can be released and disengaged without or without substantial disengagement impact, or that an advantageous release of the parking lock can be maintained when the parking condition is terminated.

In principle, this can be achieved by a closed or activated parking brake and/or a corresponding braking pressure of a service brake. In other words, when starting conditions apply or when the parking condition is terminated, the disengagement impact can be reduced or prevented by always disengaging the engaged parking lock, preferentially an engaged parking lock in an unstressed condition, before releasing or opening the parking brake and/or the reduction of braking pressure of a service brake, which functions as a roll-away protection.

The inventive solution therefore allows for maintaining the braking force preventing the rolling away of the vehicle independently of driver input (that is: even explicitly against a driver's wishes, for example when the parking brake is to be released while the parking lock is still engaged) until the parking lock is safely disengaged.

This means that the inventive solution ensures that the parking lock can be disengaged in an unstressed condition, as the vehicle is still stationary during the disengagement process. The presence of a starting condition or the termination of the parking condition can be any suitable operating situation or the actuation of any control devices in the vehicle, suggesting an imminent starting process or one that is already underway, such as, without limitation, the changing of the gear from a parking gear to a gear other than the parking gear of the automatic transmission, for example a driving gear, and/or the release of the parking brake and/or the actuation of the service brake.

The concepts of unstressed or uncharged in conjunction with the parking lock means that a parking pawl of the parking lock engages with an assigned park-lock wheel of the parking lock such that during the disengagement of the parking lock there is no or no significant disengagement impact, that is, in other words, there is no interlocking between the parking pawl and the park-lock wheel, in particular an interlock between the cogs of a parking pawl and those of the park-lock wheel, or at most to a so-defined reduced interlock between the parking pawl and the park-lock wheel, in particular between parking pawl cogs and the cogs of the park-lock wheel, with which a disengagement impact can continue to be prevented, or at least avoided or significantly reduced.

Particularly preferred is the inventive method in conjunction with a vehicle that has both a service brake, preferentially a hydraulic or pneumatic service brake, as well as a parking brake operating independently from the service brake, preferentially an electric parking brake, formed as independently operable brake systems, by means of which the vehicle can be secured against rolling away.

Especially preferred is a concrete method according to the invention in which the disengagement of the parking lock, starting from a parked vehicle with engaged parking lock, especially an engaged parking lock in an unstressed condition, and an activated parking brake, is only controlled or performed by the control apparatus upon release of the parking brake if the vehicle is secured by the service brake against rolling away, which may, for instance, be determined by the control apparatus. This means, in other words, that independent of whether or not a driver actuates the service brake, the releases the parking brake, which leads to a risk that the vehicle falls into the parking lock, leading to stress or to a charging of the parking lock, and consequently to a disengagement impact upon the disengagement of the parking lock. Therefore, in this case, the control apparatus will first check whether the vehicle is secured by the service brake against rolling away; only if this is the case, the control apparatus will allow the disengagement of the parking lock.

According to a specific method, the control apparatus determines whether at the time of releasing the parking brake, a braking pressure of an actuated service brake is set such that the vehicle is secured against rolling away, in particular independent of a further actuation of the service brake by the driver. For these purposes, for example, if the service brake is actuated at the time of releasing the parking brake, the existing braking pressure of the service brake may be controlled and/or maintained by means of the control apparatus, in particular independent of a further actuation of the service brake by a driver. If then, for example, the existing braking pressure of the service brake is sufficient for securing the vehicle against rolling away at this time, the disengagement of the parking lock can be released or performed immediately by the control apparatus. This specific method considers, on the one hand, that in case of an engaged service brake, the braking pressure of the service brake is usually sufficient to secure the vehicle against rolling away, and on the other hand, that when drivers wish to start driving, they will regularly operate or have to operate the service brake in order to initiate the starting process. Sustaining the braking pressure of the service brake may be achieved, for example, such that the present braking pressure of the service brake is locked, which may be done, for instance by way of a respective valve control.

However, if it should happen that for a service brake that is actuated or non-actuated at the time of disengagement of the parking brake, the existing braking pressure of the service brake would not be sufficient to secure the vehicle from rolling away, for example when the braking pressure falls below a predetermined braking pressure level or if there is no braking pressure at all, the braking pressure is raised, preferentially automatically and/or controlled by means of the control apparatus, such that the vehicle is secured against rolling away, for example, the braking pressure is raised to a predetermined braking pressure level securing the vehicle against rolling away. In this case, the release of the parking brake or the disengagement of the parking lock is only released or carried out, respectively, if a braking pressure was set, which secures the vehicle against rolling away, or if it was determined by the control apparatus that the predetermined braking pressure level was reached and that the vehicle is therefore secured against rolling away. This may occur, for instance, as a result of the actuation of a conveyor unit or of a pump, for example, a pump of the braking circuit. Such a pump of the braking circuit may, for example, be a hydraulic pump and/or a pump of the ESP and/or ESC system of a vehicle, to name just one example. The aforementioned case should expressly also include such operating situations in which the braking pressure of the service brake must be built up from zero, for example, because a driver is unable to operate the service brake, which is the case, for instance, in highly automated or piloted driving, in which the driver is not in the vehicle. In this case, the braking pressure, for example, an active brake booster (eBKV) and/or a traction control system (ESC) must actively build up the braking pressure from zero.

According to a further particularly preferred method, the braking pressure of the service brake which secures the vehicle against rolling away is reduced after changing to a gear other than the parking gear, for example, to a driving gear, for example, by means of the control apparatus, such that starting only becomes possible when the vehicle propulsion is greater than the downward force. The latter especially takes into account the preferred inventive application in conjunction with a vehicle parked on a slope or on an inclined plane and a driver's intent to start off from this sloping position.

In the event that the driver, after having released the parking brake, does not change from the parking gear of the automatic transmission to a gear other than the parking gear within a predetermined period of time, for example within 10 minutes (in principle, a different period may also be specified), it can be assumed that the driver does not want to start within the foreseeable future, and the parking brake for securing the vehicle is subsequently engaged. In this case too, the parking lock remains unstressed. This method takes into account that existing braking circuits using a hydraulic working medium do not permanently hold the braking pressure, leading to a systemic pressure reduction, which then requires a follow-up process (which is, in principle, possible as well), but which can be preempted due to the engagement of the parking brake.

According to an alternative method, when starting from a parked vehicle with engaged parking lock, in particular an engaged parking lock in an unstressed condition, and an activated parking brake, the control apparatus only disengages the parking brake in response to a driver-initiated release of the parking brake and given a non-actuated service brake when the parking lock is disengaged. In other words, this means that the driver does not actuate the service brake, but merely releases the parking brake. However, this immediate release of the parking brake is prevented by the control apparatus, regardless of how often the driver might initiate this release, because otherwise the vehicle would fall into the parking lock where an adverse tension would be built up. Therefore, the control apparatus only releases the parking brake when the parking lock is disengaged.

According to a further advantageous embodiment, the at least one control apparatus only executes the process if the at least one control apparatus has determined that the vehicle is parked with an engaged parking lock in an unstressed condition. This may occur due to the detection of the stress on the parking brake, for example such that a torque, resulting, for example, from the downward forces acting on the vehicle, and which is causing a stress on the park-lock wheel, and which is supported via the pawl of the gear housing, is determined and/or detected. This method ensures that the effort required by the method according to the invention is only made when a disengagement impact can reliably be prevented or at least reduced.

The above-mentioned statements relate primarily to the starting-up, which aims at ensuring that the engaged parking lock, preferentially an engaged parking lock in an unstressed condition, is also disengaged in its unstressed condition in order to avoid a disengagement impact.

To avoid or reduce the bracing of a parking lock also in conjunction with a stopping or parking procedure, it is proposed that when a parking condition is given, the parking lock is only engaged by means of the at least one control apparatus if the vehicle is secured against rolling away by means of the at least one brake system, in particular by means of the parking brake and/or the service brake operating independently of the parking brake. This means, on the one hand, that the vehicle can also be explicitly secured only by means of the parking brake against rolling away in order to ensure that the parking lock can be engaged in its unstressed condition, for instance. Alternatively or additionally, when at least one parking condition is given, the parking lock is only engaged by at least one control apparatus if the vehicle is secured against rolling away by the service brake, which can be actuated independently of the parking brake.

The latter means that the engagement of the parking lock is delayed until it has been ensured by means of the service brake, preferentially one that can be operated by a driver, that the vehicle can no longer move. Specifically, it can be determined here, for example, whether the braking pressure of the service brake is set, in particular independent of a further actuation of the service brake by the driver, such that if a parking condition is given, the vehicle is secured against rolling away. This can be immediately if the braking pressure of the service brake at the time that the parking condition is given is already sufficient to safely hold the vehicle or secure it against rolling away, which will regularly be the case when the driver slows down the vehicle to a standstill. In other words, when the braking pressure of the service brake is sufficient to safely hold the vehicle, the parking lock can be engaged immediately without delay, and there is no need to wait until the parking brake, which is slow in comparison to the service brake, is closed.

This, in turn, means that given the parking condition, if the control apparatus should also activate the parking brake at essentially the same time, the parking lock can be engaged by means of the control apparatus before the application of a parking brake force which prevents the vehicle from moving, and can therefore be engaged earlier than the parking brake, because the vehicle is secured against rolling away by means of the service brake. The braking pressure of the service brake preventing the vehicle from moving is therefore more readily available than the parking brake force, which can also prevent the vehicle from moving.

If, on the other hand, given the parking condition, the braking pressure of the service brake is not sufficient to prevent the vehicle from rolling away, that is, the braking pressure is below a predetermined braking pressure level, for example, as of which it is ensured that the vehicle is secured against rolling away by means of the service brake, the braking pressure may be raised, preferentially automatically by means of the control apparatus, such that the vehicle is secured against rolling away before the parking brake is released. This lifting of the braking pressure may be done by actuating a conveyor unit or a pump, for example, such as a pump of the braking circuit. Such a pump of the braking circuit may for instance be a hydraulic pump and/or a pump of the ESP and/or of the ESC system of a vehicle, to name just one example.

Maintaining the braking pressure of the service brake given the parking condition, in particular independently of a further actuation of the service brake, for example by way of a service brake pedal by the driver. Maintaining the braking pressure of the service brake can be done such, for example, that the existing braking pressure of the service brake is locked, which can be accomplished, for example, by corresponding valve control.

In the event that the control apparatus, given the parking condition, simultaneously also activates the parking brake, preferentially, the braking pressure of the service brake securing the vehicle against rolling away or preventing its movement is maintained or controlled by means of the control apparatus at least until the parking brake is able to apply a parking brake force preventing the vehicle from moving. This means, in other words, that when the parking brake engages and secures the vehicle from rolling away, the braking pressure of the service brake must not necessarily be maintained anymore and can be reduced accordingly. This can be done in a controlled manner, for instance, in the form of a reduction ramp, to name just one example.

Alternatively, in the event that given the parking condition, the braking pressure of the service brake should not be sufficient to secure the vehicle against rolling away, the at least one control apparatus determines whether the parking brake force of the parking brake which is activated given the parking condition is sufficient to secure the vehicle against rolling away. Should this be the case, that is, if the parking brake force of the parking brake is sufficient, the engaged parking lock can be released. Alternatively, the engagement of the parking lock is delayed until the braking pressure of the service brake and/or the parking brake force is sufficient to prevent the vehicle from rolling away. If the protection against rolling away should be secured by means of the parking brake, an optionally present or possibly locked-in braking pressure of the service brake can be reduced in the previously outlined manner. This method may be advantageous as a redundancy, for instance, or when due to the system or interferences, no adequate or sufficiently fast braking pressure of the service brake can be made available.

In conjunction with the present inventive solution, the existence of a parking condition must be understood in a broad sense, and might be, for example, a reduced stress of a brake pedal of the service brake, detected by a suitable sensor. This means that the existence of a parking condition can already be given if certain activities, operating conditions, etc. suggest that the vehicle is meant to be parked, for instance in order to allow the driver to leave it, to name just one example. Nevertheless, the selection of a parking gear in the automatic transmission constitutes a preferred parking condition, in which the parking gear is meant to be engaged by means of the control apparatus.

By way of these previously explained methods, the driver is thus supported when parking the vehicle, allowing for an unstressed or uncharged engagement of the parking lock. At the same time, this solution leads to a lower component charge in the gearbox itself during the parking phase. Moreover, ultimately, lower forces can be applied to the parking lock.

If until now we have discussed only a single control apparatus for reasons of clarity, it is understood that for the implementation of the inventive solution, of course, also multiple control apparatuses can be envisioned. Thus, according to a particularly preferred concrete embodiment, there is at least one control apparatus, and in particular, at least one control and/or evaluation apparatus, by means of which the parking lock, and specifically, a locking pawl of the parking lock, can be controlled electronically for its activation or deactivation. Alternatively or additionally, there can be at least one control apparatus, and in particular, at least one control and/or evaluation apparatus, by means of which the service brake, in particular, at least one brake cylinder on at least one vehicle wheel can be controlled electronically for detecting and/or maintaining or generating a braking pressure or for reducing braking pressure. As a further alternative or in addition, there can be at least one control apparatus, and in particular, at least one control and/or evaluation apparatus, by means of which the parking brake, in particular an electric parking brake, can be controlled electronically for its activation or deactivation. It should be further noted here that the concept of an electric parking brake is also to be understood here in a broad sense, and should comprise all kinds of electric parking brakes, including, for example, electro-mechanical or electromotorical parking brakes, to name just a few examples.

With one or more of such control apparatuses, in particular with recourse to actuators and/or sensors that may already exist on the vehicle, a method according to the invention can be realized in a simple manner with high functional reliability.

The method according to the invention can be implemented in a particularly advantageous manner when the vehicle is stopped or parked on a slope, which means that the implementation of the inventive solution can be made dependent, for instance, on whether or not the vehicle is positioned on a slope. A vehicle on a slope or, generally speaking, on an inclined plane, can be specified or defined in principle in different ways. For example, it is possible to specify that a vehicle on an inclined plane is only to be found in those cases in which the at least one control apparatus detects and/or determines that the inclined plane features or exceeds a specific defined incline or a specific defined gradient, preferentially defined by its gradient and/or inclination angle. Alternatively or additionally, it is possible to specify that a vehicle found on an inclined plane can also be found only in those cases in which the at least one control apparatus detects or determines that the downward force has reached or exceeded a specific defined threshold value. When such a slope criterion is applied, the method according to the invention will only be carried out in the inventive manner instead of or in addition to the desired parking lock function if a certain high tension or a tension of the drive train exceeding a predefined threshold value can be expected. That means that if, for example, no such slope stopping or parking situation exists, the parking lock alone can be activated or deactivated in a conventional manner, and the method according to the invention needs not to be applied.

The detection of whether the vehicle is on an inclined plane or on a slope may be done by means of a sensor device positioned on the vehicle, for instance, or alternatively or additionally, by means of at least one navigation device positioned on the vehicle. By way of a sensor device, a tilt sensor positioned on the vehicle can be considered, for example, and/or an acceleration sensor positioned on the vehicle, which provides the data to a control apparatus, which can then determine the incline or the slope of the inclined plane based on these data, or which can alternatively or additionally, determine the downward force. In an acceleration sensor this is possible because it measures the acceleration of the earth. If the sensor is tilted, the overall gravitational acceleration will no longer act on the vertical sensor axis, so that a tilt can be detected. A navigation device allows for determining location data or location coordinates, for instance, which can then be compared with terrain and topographic data stored in or accessed by the navigation device in order to determine whether the vehicle is on an incline or gradient.

Preferentially, a selection device of the automatic transmission features an external vehicle-mounted and driver-operable switching device, such as a hand selector lever, by means of which a parking gear can be deselected or selected. When the external switching device is in this parking gear, the request for an activation of the parking lock is transmitted to the control apparatus, preferentially by means of signal transmission and/or electronically. In particular, the transmission is done by means of shift-by-wire technology via a special interface, or via the vehicle bus, for example, such as a CAN-Bus. The same applies analogously reversed for the disengagement of the parking gear.

The advantages resulting from the inventive control apparatus have already been recognized in detail above. In this respect, reference is made to the explanations above. It only remains to be added that such a control apparatus can also be formed by at least one control unit already positioned on the vehicle, for example, by a transmission control unit and/or a brake control unit.

The advantageous embodiments and/or further developments of the invention described above and/or in the dependent claims reproduced can be used individually or in any combination with each other, except in cases of clear dependencies or incompatible alternatives.

BRIEF DESCRIPTION OF THE DRAWINGS

In what follows, only examples of the invention will be explained, with reference to a drawing.

The following are shown.

DETAILED DESCRIPTION OF THE DRAWINGS

Figure 1:
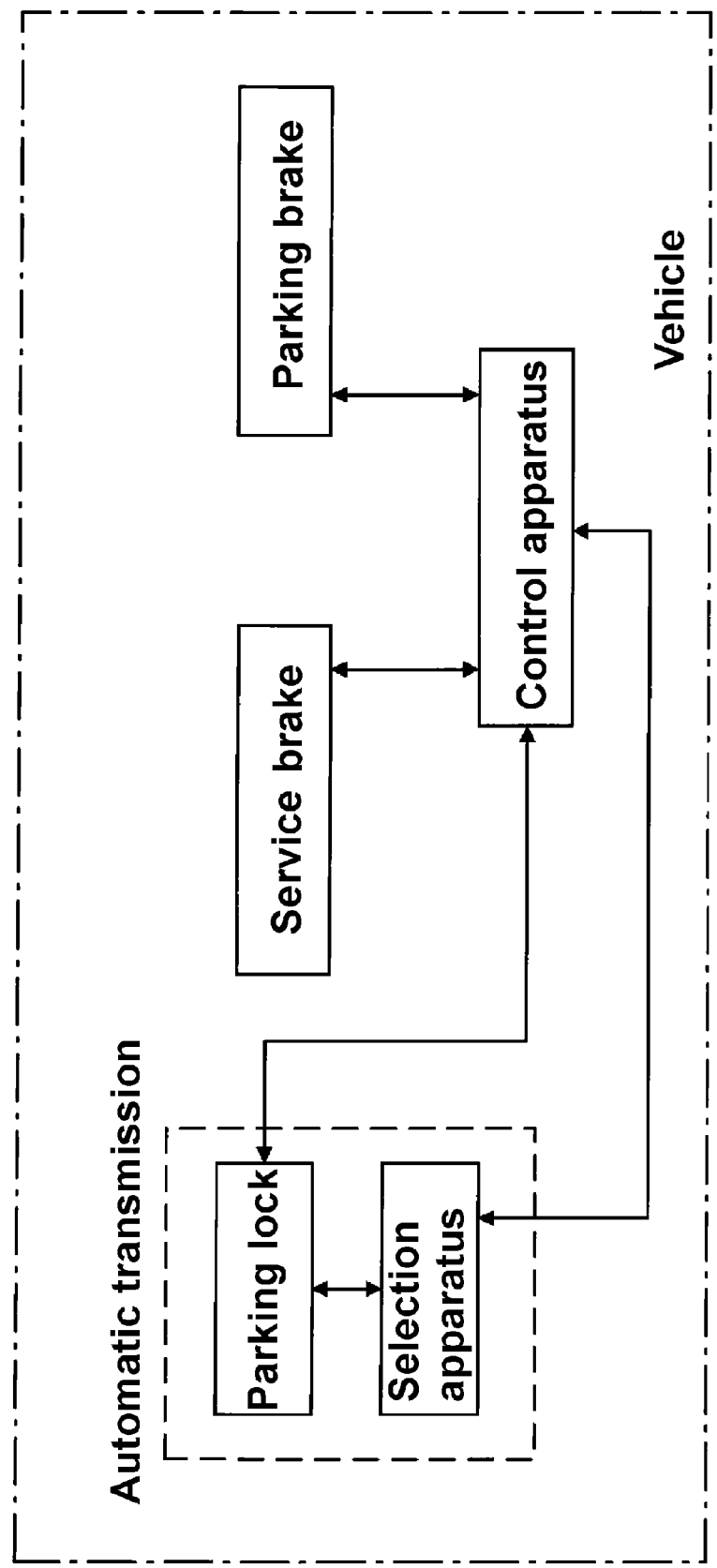
FIG. 1 schematically, a basic structure of a vehicle-mounted apparatus for executing a method according to the invention, FIG. 2 schematically, an exemplary flow chart for engaging a parking lock, FIG. 3 a method alternative to FIG. 2 for engaging a parking lock, and FIGS. 4 to 6 schematically different exemplary flowcharts for disengaging a parking lock.

FIG. 1 exemplarily shows a structure of an apparatus for executing the method according to the invention with a control apparatus, a parking brake, a service brake, and an automatic transmission (shown in dashed lines). The automatic transmission comprises among other things a previously described parking lock and a selection apparatus, by means of which a parking gear as well as at least one driving gear can be selected. Specifically, the selection device can be formed by an external vehicle-mounted and driver-operable switching device, for example by a hand selector lever, by means of which external switching apparatus, the parking gear or the at least one driving gear can be selected.

The selection apparatus is connected by signal transmission with the parking lock, the default setting being such that when the parking gear is selected, the parking lock is activated, and in particular, an electrically controlled or electro-mechanically actuated parking pawl engages an associated park-lock wheel. As will be further illustrated below by means of selected examples, This default setting may be modified by the inventive solution in order to engage or disengage the parking lock only after it is ensured that a tension-reduced disengagement of the parking lock with a reduced or preempted disengagement impact is possible.

As can be further taken from the schematic illustration of FIG. 1, a vehicle comprising an automatic transmission, specifically: a motor vehicle, more preferentially includes a service brake or a parking brake which can be activated or deactivated independently of the service brake. The service brake is designed for example as an hydraulic service brake, but could also be a pneumatic service brake. In principle, the parking brake can be a mechanical parking brake, but preferentially it is an electric parking brake.

Furthermore, as shown in FIG. 1, the vehicle comprises at least one control apparatus which is connected in a signal transmitting manner with the service brake, the parking brake, the parking lock and the selection device. By means of the control apparatus, the parking lock, in particular a locking pawl of the parking lock, can thus be controlled for its activation or deactivation. By means of the control apparatus, the service brake, in particular: at least one brake cylinder on at least one vehicle wheel, may be further controlled electronically for detecting and/or maintaining or generating a braking pressure or for reducing a braking pressure. Furthermore, the parking brake can be controlled electronically by means of the control apparatus for its activation or deactivation.

The signal-transmitting connection between the selection device and the control apparatus allows for a feedback, for example, whether a parking gear is to be or has been engaged or disengaged by the selection device, respectively.

Figure 2:
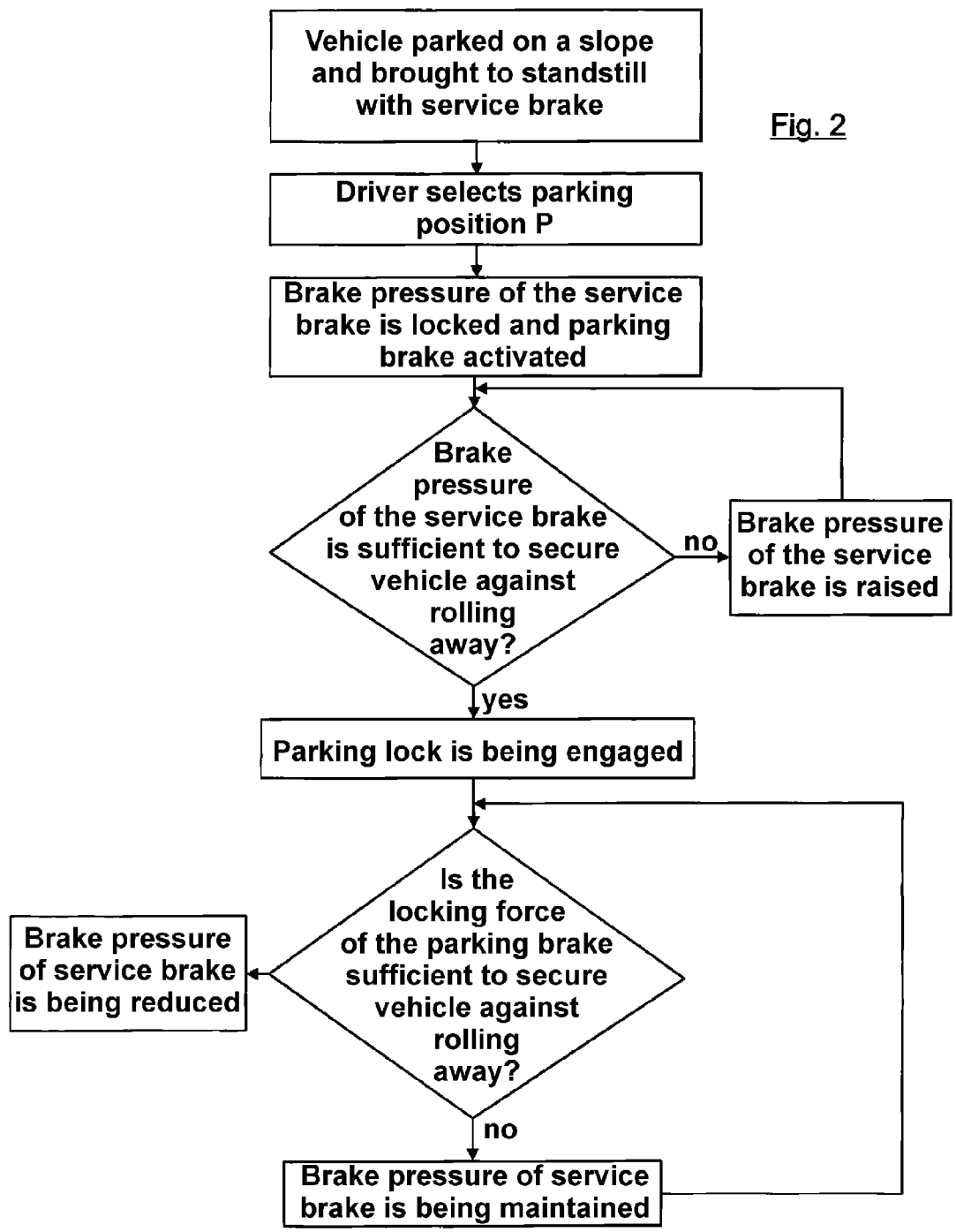

With a thusly constructed apparatus in a vehicle, which may naturally comprise further components, it is possible to advantageously engage a parking lock as shown as an example in FIG. 2 by means of a flow chart, such that it is ensured that the engaged parking brake is uncharged or unstressed such that a disengagement impact is avoided or at least largely prevented when the parking lock is disengaged:

As can be seen from FIG. 2, this exemplary case assumes that the vehicle is parked on a slope and was brought to standstill by means of a service brake. If the driver subsequently selects the parking gear "P", this is considered to be the presence of a parking condition and a pending braking pressure of the service brake is locked, in particular independently of a further actuation of the service brake by the driver, controlled by means of the control apparatus, for example by appropriate control of valves in the braking circuit. The concept of "locking" is expressly to be understood here in a broad sense, and should expressly include all measures that are suitable for setting a specific operating pressure.

Preferentially, as shown in FIG. 2, the parking brake is activated essentially simultaneously by means of the control apparatus as well.

Subsequently, in a next step, it is checked whether the braking pressure of the service brake is sufficient to secure the vehicle against rolling away, or to safely prevent a vehicle movement.

If this is not the case because the currently locked braking pressure of the service brake is not sufficient to prevent the vehicle from rolling away, a conveyor device is controlled by the control apparatus, for example a pump of the braking circuit, and the braking pressure of the service brake is substantially raised automatically to the required or predetermined braking pressure level. The braking pressure of the service brake is thus sufficient to prevent the vehicle from rolling away, so that the engagement of the parking lock is now released and the parking lock can be engaged.

If, however, the locked braking pressure of the service brake should already be sufficient to prevent the vehicle from rolling away, the engagement of the parking lock can be released immediately, and the parking lock can thus be engaged immediately.

Then it can be determined, with the parking brake activated, if the parking brake force of the parking brake is already sufficient to prevent the vehicle from rolling away. If this is the case, the braking pressure of the service brake can be reduced. Otherwise, the braking pressure of the service brake is maintained until this condition is satisfied.

If the parking brake force of the parking brake is then sufficient to prevent the vehicle from rolling away, it is ensured that, despite the engaged parking lock, no tension can occur in the area of the parking lock and thus the parking lock can be engaged without a disengagement impact when the vehicle starts driving.

Figure 3:
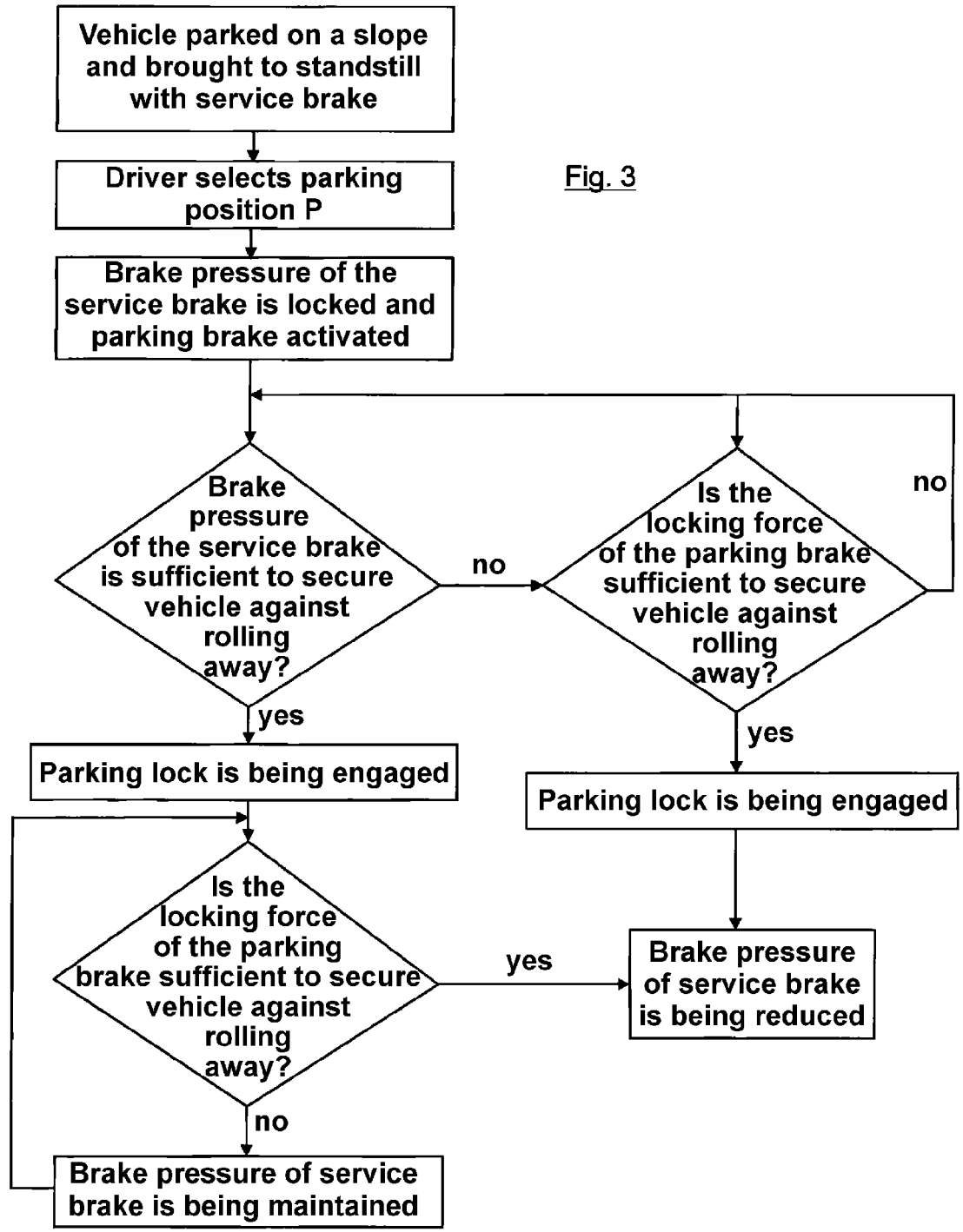

In FIG. 3, an embodiment alternative to the one in FIG. 2 is shown, which differs from it in that in the event that the current braking pressure of the service brake, given the parking condition, falls below a predetermined braking pressure level ensuring protection against rolling away, the control apparatus examines whether a parking brake force of the activated parking brake is already present to secure the vehicle against rolling away. If this is the case, the parking lock can be engaged. Furthermore, an optionally present or locked braking pressure of the service brake can then be reduced in a defined manner. Otherwise, the engagement of the parking lock is delayed until the braking pressure of the service brake and/or the parking brake force is sufficient to prevent the vehicle from rolling away.

Figure 4:
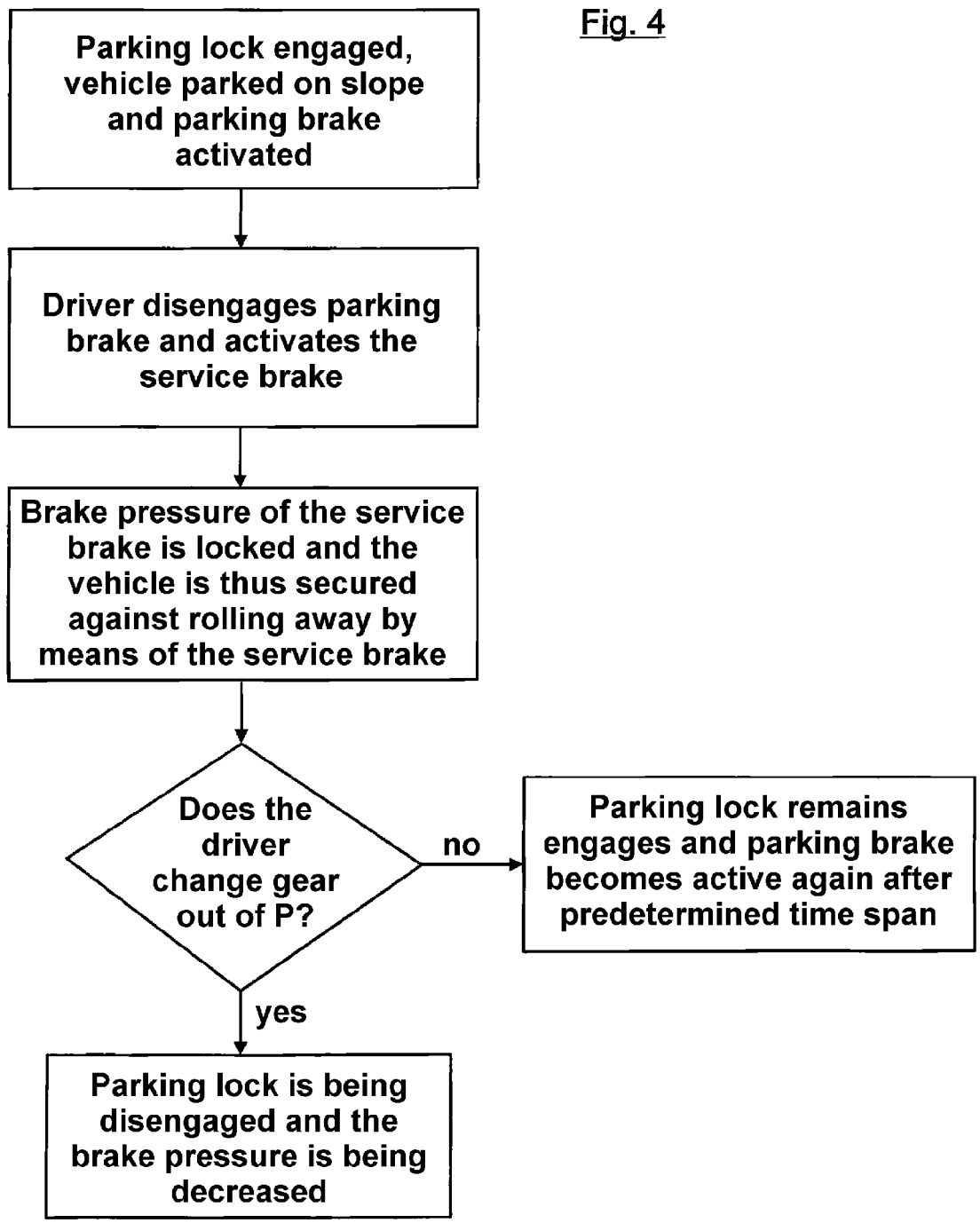
Figure 5:
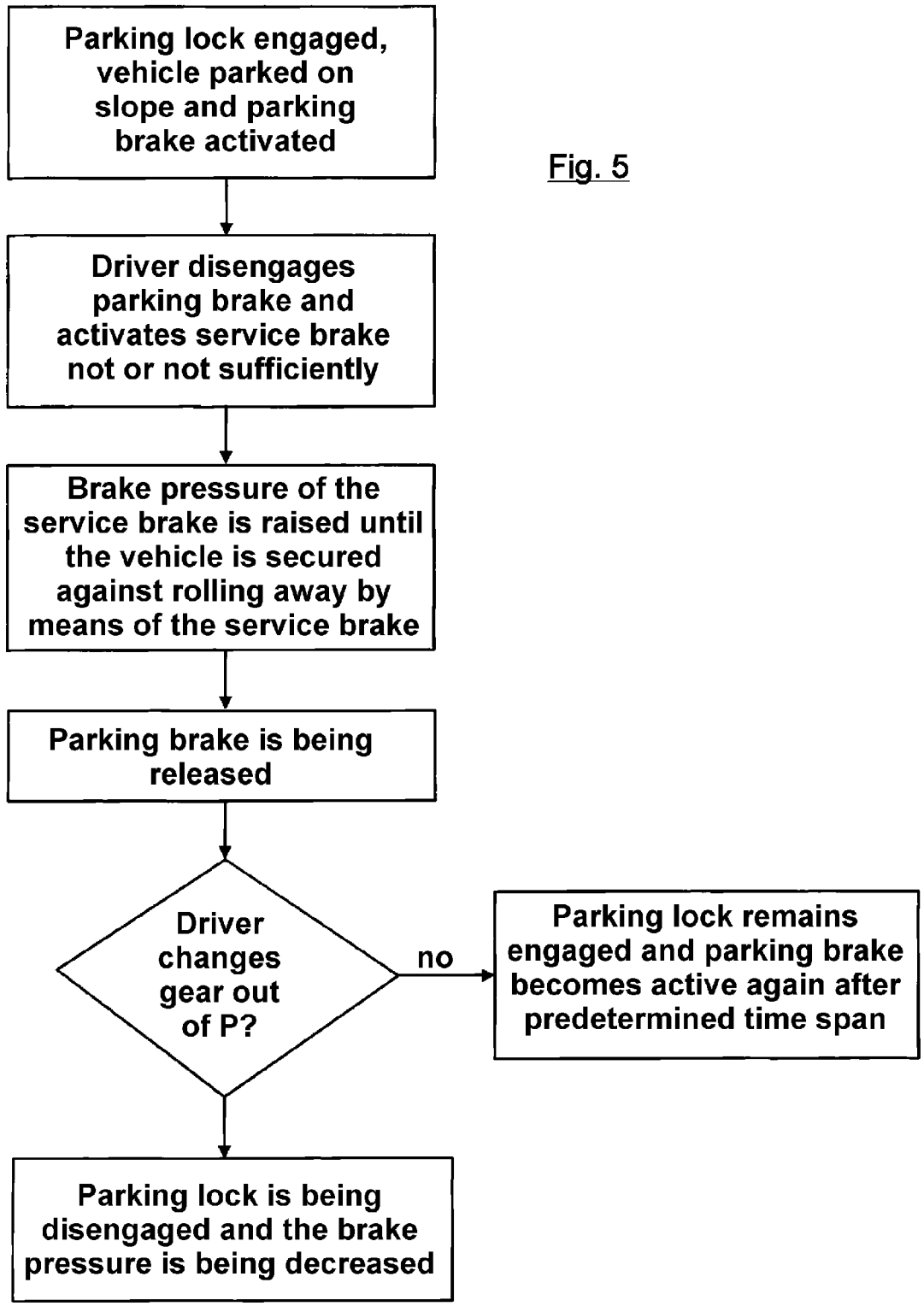
Figure 6:
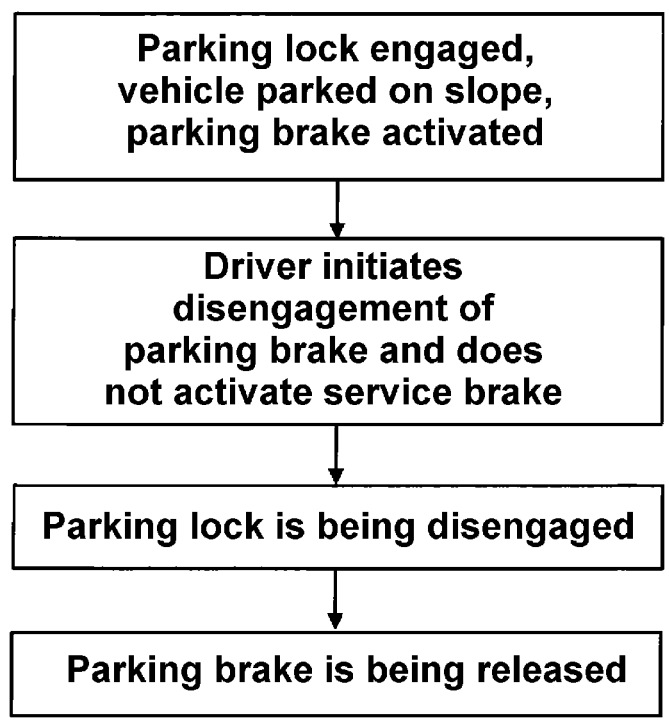

In what follows, various scenarios are now explained in an exemplary manner with reference to the flowcharts of FIGS. 4 to 6, by means of which it can be ensured by way of example that a disengagement impact can be reliably avoided even as a start-up operation is imminent or already underway, in which case an engaged parking lock in an unstressed condition is only assumed by way of example:

It should also be expressly mentioned here that the unstressed or uncharged engagement of the parking lock can, in principle, be done in different ways, and may explicitly not be reduced to those cases that have been previously described in closer detail. For example, the unstressed engagement could also be done so that the parking lock, given a parking condition, is only engaged by means of the at least one control apparatus if the vehicle is secured against rolling away by means of the parking brake, or the unstressed engagement could also be done as described in DE 10 2013 212 829 A1.

As can now be taken from FIG. 4, it is first assumed that the vehicle is parked on a slope, that the parking gear "P" is selected or engaged (preferentially with unstressed parking lock), and that the parking brake is activated as well.

If the driver releases the parking brake and activates or engages the service brake, the braking pressure of the service brake is locked, for example via a corresponding valve control in the braking circuit of the service brake, and the vehicle is thus secured by the service brake against rolling away.

Subsequently, it is checked whether the driver actually changes gears out of the parking gear P. Should this be the case, the parking lock is disengaged and the braking pressure can be reduced in a defined manner. For this purpose, a time delay, a reduction ramp or various start-up logics (for example, a start-up only when the driving force is larger than the downward force) may be provided.

If, on the other hand, the driver does not switch out of the parking gear during a specified period, it can be assumed that the driver does not want to start-up. In this case, the parking lock remains engaged and the parking brake is reactivated by the control apparatus. Switching out of the parking gear is to be understood here and below merely by way of example or in a broad sense, and should expressly comprise any switching from one parking gear to any gear other than the parking gear of the automatic transmission.

In FIG. 5, the case is shown that the vehicle is parked on a slope, the parking gear P (preferentially with unstressed parking lock) is selected or engaged and the parking brake is activated. Here too, the driver releases the parking brake analogously to the embodiment shown in FIG. 4, but then does not activate or engage the service brake, or not to such an extent, that the braking pressure of the service brake is sufficient for the service brake to secure the vehicle against rolling away. This should explicitly also include the case that the vehicle is operated automatically (as is the case in highly automated and piloted driving), because also in this case there is no braking pressure of the service brake.

Specifically, the braking pressure is essentially raised automatically by means of the control apparatus, up to a braking pressure (optionally starting from zero), with which the vehicle is secured against rolling away, wherein the release of the parking brake is only released when a braking pressure ensuring rolling away has been reached.

Subsequently, it is checked whether or not the driver actually switches out of the parking gear. If this is the case, the disengagement of the parking lock is released and then the parking lock can be disengaged. In addition, the braking pressure in the manner previously described in connection with FIG. 4 can be reduced. Otherwise, the parking lock remains engaged and the parking brake is also reactivated analogously to the method previously described in connection with FIG. 4.

In FIG. 6, another alternative method is shown, in which it is assumed that the parking gear P (preferentially with unstressed parking lock) is selected or engaged, that the vehicle is parked on a slope, and that the parking brake has been activated. If the driver initiates the release of the parking brake and does not engage the service brake, then, first, the parking lock is disengaged, and subsequently the parking brake is actually released.

The invention claimed is:

1. A method for activating a braking device in the drive train of a vehicle with an automatic gear box, with a parking lock and at least one braking system,
    securing a parked vehicle having the parking lock in an engaged state against rolling away by at least one of a service brake and an independently operable parking brake;
    releasing the parking brake and disengaging the parking lock of the parked vehicle by a control apparatus in response to a starting condition, wherein the parking lock is only released if the vehicle is secured against rolling away by the service brake;
    raising a brake pressure of the service brake in the event that the brake pressure of the service brake is insufficient at the time of releasing the parking brake to secure the vehicle against rolling away, wherein the release of the parking brake and disengagement of the parking lock is only permitted when the brake pressure of the service brake has been reached with which the vehicle is secured against rolling away.

2. The method according to claim 1, wherein the control apparatus determines if the brake pressure on the service brake activated at the time of releasing the parking brake is adjusted in such a manner that the vehicle is secured against rolling away.

3. The method according to claim 2, wherein the disengagement of the parking lock is released by the control apparatus if the brake pressure on the service brake is sufficient to prevent the vehicle from rolling away.

4. A method according to claim 1, wherein the service brake brake pressure for preventing rolling away is reduced by the control apparatus to a level suitable for a non-neutral gear after changing gear, so that driving away is only permitted when a vehicular propulsion of the vehicle is greater than a slope descending force.

5. The method according to claim 1, wherein the parking brake is reactivated in the event that a driver, having released the parking brake, does not change from a neutral gear of the automatic gearbox to a non-neutral gear within a predetermined period of time.

6. The method according to claim 1, wherein the at least one control apparatus only operates when the vehicle is parked with an unloaded engaged parking lock.

7. The method according to claim 1, wherein the starting condition of the vehicle includes at least one of changing a gear from a park position to a non-neutral gear of the automatic gearbox, the releasing of the parking brake, or the engagement of the service brake present.

8. The method according to claim 1, wherein in a parking condition, the parking lock is only engaged by means of the control apparatus when the vehicle is secured against rolling away by means of the parking brake or the service brake.

9. The method according to 8, wherein when the parking condition is met and the service brake is engaged, the control apparatus determines whether the brake pressure of the service brake is set such that the vehicle is secured against rolling away.

10. The method according to claim 9, wherein the engagement of the parking lock is released by the control apparatus if the brake pressure of the service brake present at the parking condition is sufficient to prevent the vehicle from rolling away.

11. The method according to claim 9, wherein if the brake pressure from the service break at the present parking condition is not sufficient to secure the vehicle against rolling away, the control apparatus automatically raises the brake pressure of the service brake so the vehicle is secured against rolling away, and the engagement of the parking lock is only released once a brake pressure is achieved that secures the vehicle against rolling away.

12. The method according to claim 8, wherein the control apparatus, when the parking condition is present, activates the parking brake.

13. The method according to claim 12, wherein the brake pressure of the service brake present to secure the vehicle against rolling away is maintained by the control apparatus until the parking brake applies a parking brake force to prevent the vehicle from rolling away.

14. The method according to claim 13, wherein a service brake side brake pressure present to secure the vehicle against rolling away is reduced by the control apparatus after reaching a vehicle moving preventative parking brake force.

15. The method according to claim 8, wherein when the brake pressure of the service brake at the parking condition is not sufficient to secure the vehicle against rolling away, the control apparatus determines whether the parking brake force of the parking brake present at the parking condition is sufficient to secure the vehicle against rolling away, and the engagement of the parking lock is delayed until the service brake side brake pressure or the parking brake force is sufficient to secure the vehicle against rolling away.

16. A method according to claim 8, wherein selection of a non-neutral gear of the automatic gearbox provides a parking condition where the parking lock controlled by the control apparatus is engaged.

17. The method according to claim 1, wherein the control apparatus controls the activation or deactivation of the parking lock, including a pawl of the parking lock, controls a detection, maintenance, or generation of the brake pressure of the service brake, including at least one brake cylinder on at least one vehicle wheel, and controls the activation or deactivation of the parking brake when the vehicle is secured against rolling away.

18. A method according to claim 1, wherein the control apparatus only operates the braking device when the vehicle is parked on a slope.

19. A control apparatus for activating a braking device in the drive train of a vehicle, comprising:
an automatic gear box;
a parking lock comprising a gear-side parking lock;
a service brake; and
a parking brake,
wherein, when a parked vehicle is parked and the parking lock can disengage so long as the vehicle is secured against rolling away by at least one of the service brake and parking brake until the parking lock is released,
wherein disengagement of the parking lock, starting from the parked vehicle with the parking lock in an engaged state and the parking brake in an engaged state, when loosening the parking brake, the parking brake is only released by the control of the control apparatus if the vehicle is secured from rolling away by means of the service brake,
wherein the parking brake is released and the parking lock is disengaged by the control apparatus in response to a starting condition, wherein the parking lock is only released if the vehicle is secured against rolling away by the service brake;
wherein a brake pressure of the service brake is raised in the event that the brake pressure of the service brake is insufficient at the time of releasing the parking brake to secure the vehicle against rolling away,
wherein the release of the parking brake and the disengagement of the parking lock is only permitted when the brake pressure has been reached with which the vehicle is secured against rolling away.

20. The control apparatus according to claim 19, further comprising at least one sensor or actuator to engage the parking lock a parking condition is met only when the vehicle is secured against rolling away by the parking brake or service brake.

* * * * *